(12) United States Patent
Krumpe

(10) Patent No.: US 9,596,953 B1
(45) Date of Patent: Mar. 21, 2017

(54) HAND HELD BUTTER APPLICATOR, BUTTER STORAGE COMPARTMENT, COOKING UTENSIL, AND TABLE-TOP FLOOD RELATED ACCESSORY

(71) Applicant: Geraint Godfellow Krumpe, Suffolk, VA (US)

(72) Inventor: Geraint Godfellow Krumpe, Suffolk, VA (US)

(\*) Notice: Subject to any disclaimer, the term of this patent is extended or adjusted under 35 U.S.C. 154(b) by 29 days.

(21) Appl. No.: 14/627,367

(22) Filed: Feb. 20, 2015

Related U.S. Application Data

(60) Provisional application No. 61/943,574, filed on Feb. 24, 2014.

(51) Int. Cl.
*A47J 9/00* (2006.01)
*B65D 83/00* (2006.01)

(52) U.S. Cl.
CPC .............. *A47J 9/00* (2013.01); *B65D 83/0011* (2013.01); *A47J 2009/008* (2013.01)

(58) Field of Classification Search
IPC ....................................... B65D 83/005,83/0011
See application file for complete search history.

(56) References Cited

U.S. PATENT DOCUMENTS

| | | | | |
|---|---|---|---|---|
| 2,980,247 A * | 4/1961 | Di Giantomasso | .. | A47G 19/183 15/184 |
| 3,162,884 A * | 12/1964 | Bordwine | .............. | A47G 19/26 222/386 |
| 4,544,083 A * | 10/1985 | Schroeder | .............. | A45D 40/04 222/157 |
| 4,865,480 A * | 9/1989 | Reynolds | ............... | A45D 40/04 401/174 |
| 6,939,070 B2 * | 9/2005 | Butz | .................. | B65D 83/0011 401/175 |
| D522,696 S * | 6/2006 | Severa | .......................... | D28/88 |
| 8,029,204 B2 * | 10/2011 | deVirag | .................. | A47J 47/01 222/326 |

\* cited by examiner

*Primary Examiner* — David Walczak
(74) *Attorney, Agent, or Firm* — Soula Skokos; Skokos Law Group LLC

(57) ABSTRACT

A method and device for housing, storing and presenting butter in a hand held fashion for use in dining, cooking, and storage, where the housing securely accommodates a standard quarter pound stick of butter within said housing. Said housing is comprised of a body having a single opening and features a cap for measuring variable amounts of butter protruding from such opening, The housing further possesses a threaded feature penetrating the length of the stick of butter and provides a bracket at the base of the stick of butter to securely move the butter into or out of the housing. The novel housing enables the user to load and unload the stick of butter in an ergonomic, sanitary, and efficient manner.

9 Claims, 8 Drawing Sheets

US 9,596,953 B1

HAND HELD BUTTER APPLICATOR, BUTTER STORAGE COMPARTMENT, COOKING UTENSIL, AND TABLE-TOP FLOOD RELATED ACCESSORY

CROSS REFERENCE

The present invention claims benefit to the provisional application entitled Hand Held Butter Applicator, Butter Storage Compartment, Cooking Utensil, and Table-Top Food Related Accessory, U.S. Patent Application No. 61/943,574, filed on Feb. 24, 2014, by the same inventor.

BACKGROUND OF THE INVENTION

This invention relates to butter dispensers and storage containers; specifically devices adequate to store, dispense, and present a single standard quarter pound stick of butter widely available in domestic marketplaces. Butter is generally stored, applied from, or served from a decorative or non-decorative dish or directly from the wrapper. Several innovations, such as U.S. Pat. No. 4,544,083, provide for a sanitary butter dispenser that can be hand held, disassembled for cleaning, and store and dispense spreadable food selectively by turning a knob, or compressing a shaft or plug. It is of great importance that a device that stores, presents, is held and used by ejecting a portion of butter for use in cooking and food preparation, accept only a standard quarter pound stick of butter, anchor said butter to prevent unintended release of butter, while enabling finite control of the selective dispensing of the butter, provide an easy method for loading or unloading a stick of butter while maintaining said anchor and control, providing means by which to measure standard cooking portions, and enabling the use of such a device in cooking applications where high temperature is a factor, all while maintaining a rectangular cross section through the device assembly for measurement and tactile and visual ergonomics.

SUMMARY OF THE INVENTION

Therefore what is needed is an ideal and ergonomic butter storage and dispensing device having a housing most adequate to accommodate a standard 1 quarter pound stick of butter, or a half stick of butter. The present invention features one open end providing a secure transparent cap with indicators for measurement. The present invention further features an ideal and ergonomic control knob for selectively dispensing and more quickly and easily loading a stick of butter, featuring a method for turning the control knob with an offset cavity, and molded to a threaded rod designed to insert along the internal length of the stick of butter, and engage an improved and more functional kind of piston or control bracket designed to more securely hold and control and stick of butter, and an entire assembly featuring the equivalent rectangular cross section, as well as rounded edges to improve grip and comfort. The present device can also be molded from heat resistant moldable material which is easily assembled and disassembled for cleaning and sanitary purposes.

The preferred embodiment of this invention provides a molded rectangular housing comprised of heat resistant plastic sufficient to closely accommodate a standard quarter pound stick of butter readily available to the US consumer. Such embodiment further comprises a rectilinear knob with the same cross section of the housing. Having a knob that is both rectilinear and the same cross section allows the user to measure the amount of butter is being dispensed by allowing the user to measure the amount of turns of said knob the user has made that are full turns, half turns or quarter turns. Such novel knob allows the user to more accurately measure the amount of butter is made with each movement of the user. This adjustment knob is superior and different to other adjustment knobs related to butter dispensing devices by said description, but further differentiates and improves upon the present invention by means of providing and ergonomic and easy method for loading and unloading a stick of butter, and is easily pulled away from the housing by a snap feature to enable cleaning.

The present invention is further comprised of a threaded shaft to penetrate along the long axis of the stick of butter supports and bracket that contacts a portion of the butter by contacting at least 2 surfaces of an inserted stick of butter, The bracket has one bottom surface that comes into direct contact with an inserted stick of butter and has at least one side wall lying parallel to and within one side of the housing. The design of the bracket allows the bracket to come into contact with more surface are of the stick of butter thereby causing the stick of butter to be further anchored to the bracket. The bracket further features enough thread contact to the shaft to encourage the erect penetration of the butter. The parts and advantages of the present invention are illuminated by the drawings and detailed description.

DESCRIPTION OF THE PREFERRED EMBODIMENT

Figure 1:
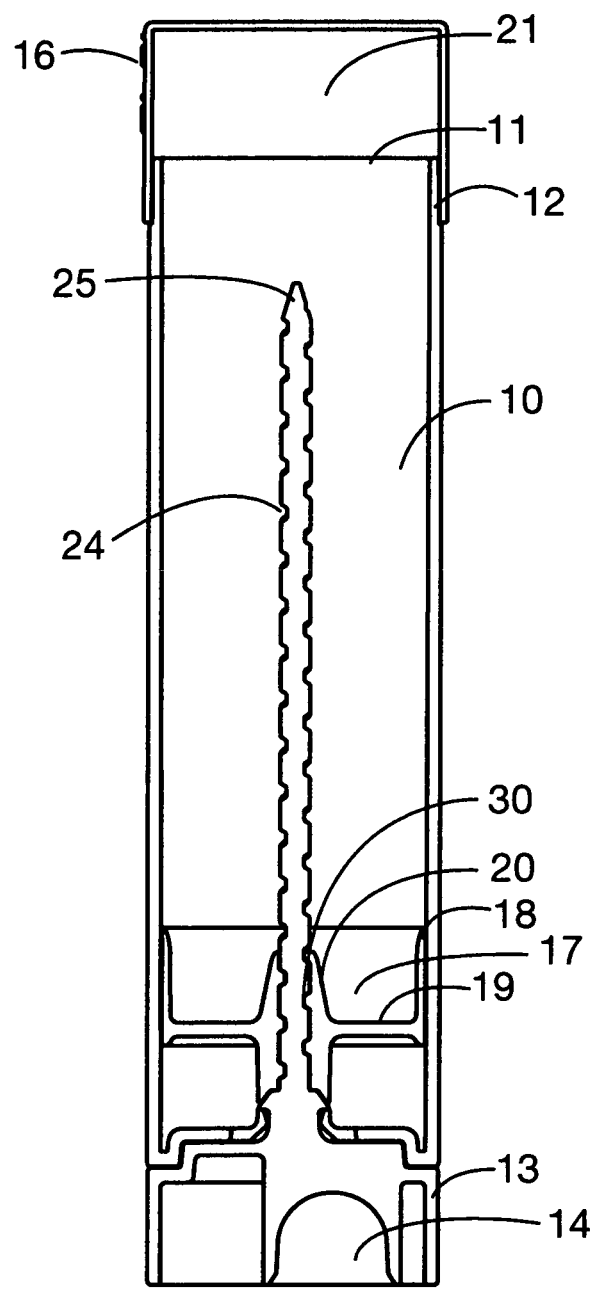
FIG. 1 is a cross sectional view of the butter dispenser utensil at present invention.
Figure 5:
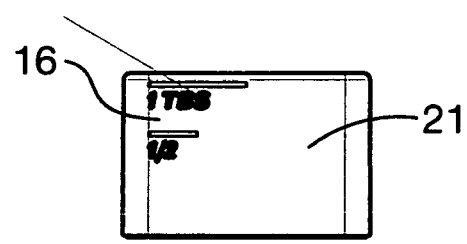
FIG. 5 is a front, orthographic view of the cap of the present invention.
Figure 6:
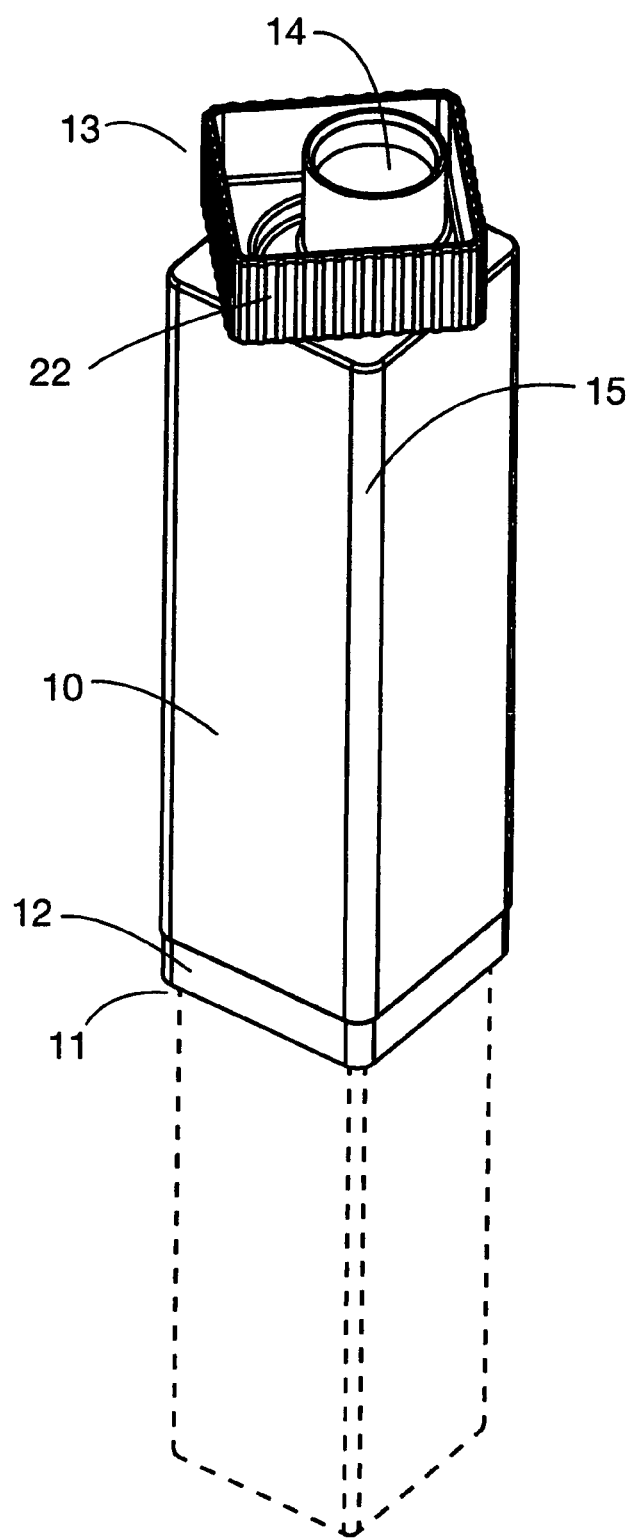
FIG. 6 is a pictorial view of the bottom isometric view of the present invention with a stick of butter in the preferred loading position.

Referring to FIG. 6 there is a rectilinear housing 10, shown in pictorial view and presented to accommodate a standardized quarter pound stick of butter loading from the loading and dispensing end 11. This opening 11, is shown in FIG. 1 in cross section view. This opening 11 features a step down feature 12 to accept a cap 21 as shown in FIG. 5, and is secured by contact. Said cap 21 is removable by the user, and a standard one quarter pound stick of butter can be inserted into the opening 11 of the device. The view of FIG. 6 demonstrates the preferred loading position and improved method of loading a standard stick of butter into a butter dispenser housing 10.

As shown in FIG. 1, a cross section view of the device, the dispensing and loading knob 13 is molded to include a threaded rod 24, extending centrally along the length of the housing 10. Said threaded rod 24 engages with a butter control bracket 19 via the internal threaded through hole 30 of the bracket that engages with the corresponding external thread of the rod 24. The body of the bracket 19 moves along the shaft of the rod allowing bracket to move in a linear fashion down the length of the rod 24 and housing 10. This bracket has a tapered conical feature at the end 20, where the bracket of FIG. 3 contacts and secures the butter. This taper is drafted to pierce the butter stick, and encourage the compression of the butter stick outwards to more securely contact the at least one outer wall 17 of the bracket and the base surface of the bracket 19, to further secure the butter for secure use and loading. To further aid in the loading of the butter stick, the at least one side wall of the bracket are drafted to reduce contact with the butter at the entrance of the bracket. Additionally, as shown in FIG. 1, the integrated threaded rod 24 of the control knob is drafted to pierce the butter stick, and the threads provide an adequate steepness of grade for the butter to be further secured along the surface and axis of the threaded rod 24.

Figure 2:
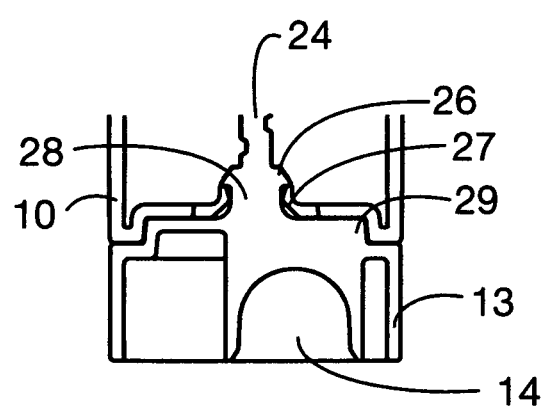
FIG. 2 is a cross sectional, partially cut-away view of the dispenser of FIG. 1 with the butter control bracket removed.
Figure 3:
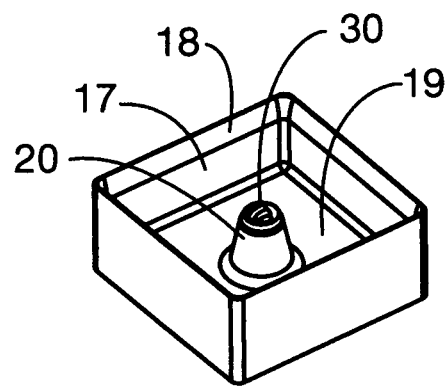
FIG. 3 is a pictorial view of the butter control bracket of the present invention.

As shown in FIG. 2, a cut off cross section view with the bracket of FIG. 3 removed from view, the control knob 13 and integrated threaded rod 24 provide for the bearing surfaces 28 and 29, for contact and rotation within the housing 10. Furthermore, as shown in FIG. 2 the control knob 13 and housing 10 have molded features of a chamfered barb 26, and a flexible catch 27, which provide the snap to fit engagement of the assembled parts, and allow for the disassembly by the user for easy cleaning.

Furthermore, the knob 13 has a semicircular feature 14 which is offset and provides a cavity for the user to insert a finger to turn the integrated knob 13 and threaded rod 24 more efficiently to allow the user to load the butter quickly and consistently into the housing 10, about the threaded rod 24, and secured to the butter securing and controlling bracket represented in pictorial view in FIG. 3.

As represented in FIG. 6 this device secures a stick of butter for use by hand in any holding position, and the housing 10, is molded from heat resistant material which allows the user to grip the device and apply butter to hot surfaces or directly to food items from the opening 11.

Figure 7:
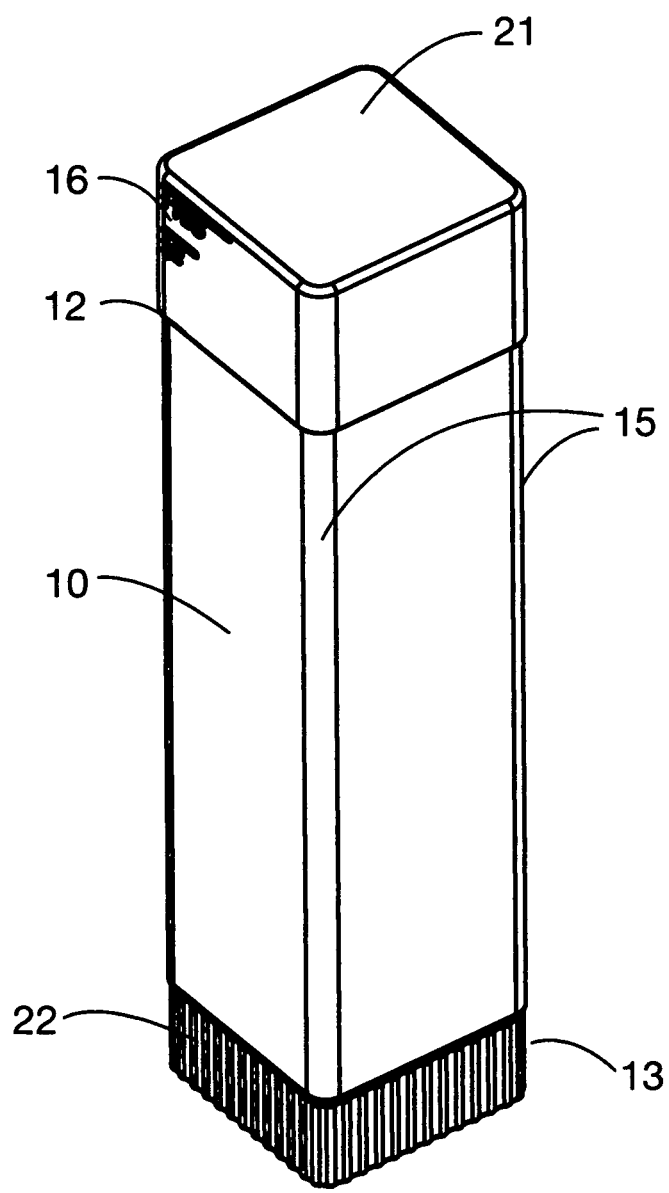
FIG. 7 is a pictorial view of the fully assembled butter dispenser of the present invention.

As shown in FIG. 7 there is a cap 21 which is molded from transparent or semi-opaque material which features markings 16 that allow for the user to select measured amounts of the standard butter stick in increments of a tablespoon or a half tablespoon. FIG. 7 further demonstrates that the cap 21 and the loading/dispensing adjustment knob 13, follow the same rectangular cross-section as the housing 10. Such novel knob 13 allows the user to more accurately measure the amount of butter is made with each movement of the user. Due to its rectilinear cross section, the user can accurately measure each quarter or 90% turn because with each quarter or 90% turn the sides of the knob 13 can be counted incrementally and noted in relation to the amount of butter dispensed, allowing the user to accurately measure each quarter turn of the knob 13. Further, if the user turns the knob 13 by 45%, the sides of the knob 13 and housing 10 are no longer aligned, allowing the user to easily pull apart or dissemble the device.

Figure 8:
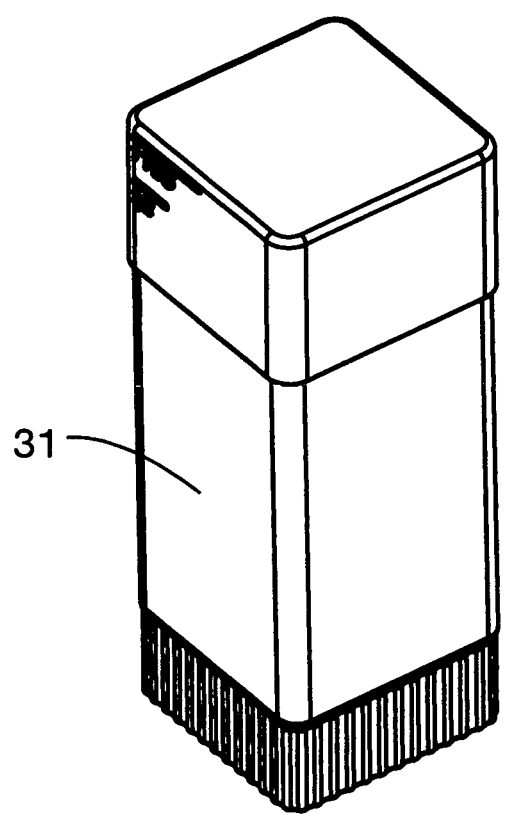
FIG. 8 is a pictorial view of an embodiment of the present invention.

The housing further has rounded corners 15 is provided for a more comfortable and usable grip throughout. Additionally the knob 13 features molded knurling to further enhance the grip and usability of the device. FIG. 5 is a front orthographic view of the transparent cap 21, with indicators molded or printed upon it to allow the selective measurement of one or one half tablespoon of a standard one quarter pound stick of butter, or as represented in FIG. 8 a housing 31 having a shorter length can accommodate a standard ⅛ pound half stick of butter. Furthermore, the measurement indicators 16, designate the measurement from the end of the housing from FIG. 6, opening 11, where the user can cut the measured section of butter from the remaining butter within the housing.

Figure 4:
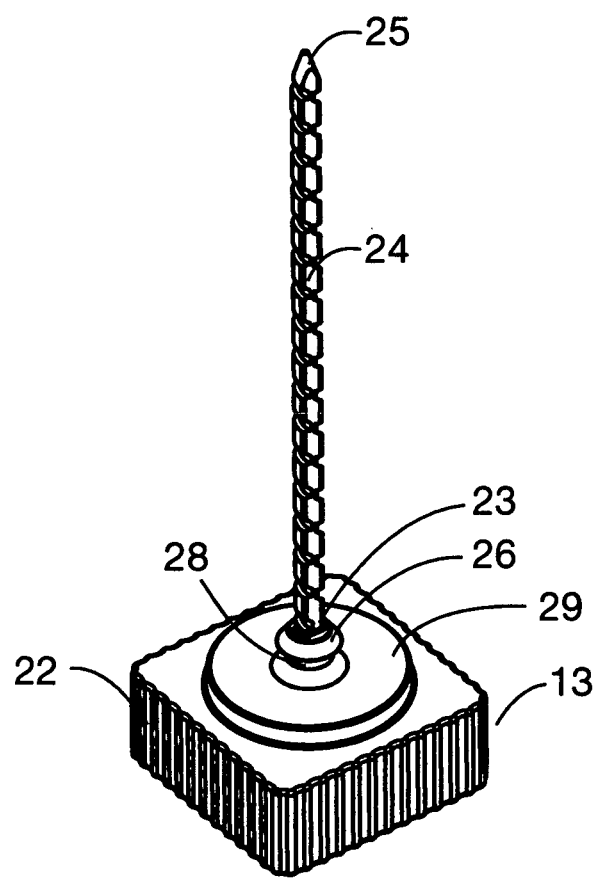
FIG. 4 is a pictorial view of the integrated adjustment knob and drive shaft of the present invention.

In one embodiment, as shown in FIG. 4, the rod 24 may have flat segments which allows for easy injection molding. For ease of manufacturing, the rod has flats caused by injection molding of the rods which allows for easier and more efficient mass production.

Although the above description has described the present invention with respect to specific embodiments, the foregoing description is intended to be illustrative, and not restrictive. Those skilled in the art will realize that many modifications of the preferred embodiment could be made which would be operable. All such modifications, which are within the scope of the present disclosure, are intended to be within the scope and spirit of the present invention.

I claim:

1. A device for storing and dispensing a standard stick of butter comprising: A rectilinear housing having at least one rectilinear cavity extending the length of the housing wherein at least one end of the housing is open and sized to accommodate the insertion of a standard stick of butter; at least one rectilinear knob at the end of the housing distal to the open end of the housing wherein said knob has an off center cavity within a hollow lower portion thereof and sized to receive a fingertip of a user therein to allow the user to turn the knob by inserting the fingertip into said cavity in the knob and rotating the knob with the fingertip; at least one rod extending axially from the knob and extending along the length of the housing within the cavity of the housing possessing external threads; and an open ended bracket to which the inserted stick of butter is anchored and wherein the bracket possesses a threaded through-hole through the center of the bracket which is engaged with the external threads of the at least one rod allowing such bracket to move in a linear motion along the length of the rod within the housing when the knob is turned thereby allowing the inserted stick of butter to move in a linear motion along the cavity in the housing.

2. The device of claim 1 wherein said device is further comprised of a transparent cap having measurement indicators to allow the user to measure butter extending from the housing in predefined increments.

3. The device of claim 1 wherein said knob and the rod is constructed to be a single component.

4. The device of claim 1 wherein said bracket has side walls of a predetermined height to grip a portion of the sides of the stick of butter.

5. The device of claim 1, wherein said bracket has a conical feature to pierce and anchor the inserted stick of butter.

6. The device according to claim 5 wherein the external threads on the rod are adapted to pierce the butter providing anchor for the stick of butter.

7. The device of claim 1 further comprising a barb integrated into the knob that when assembling the device is pushed beyond flexible catches on the interior surface of the housing thereby permitting the parts to snap together and allowing for easy assembly and disassembly of the device for cleaning.

8. The device of claim 1 wherein said housing, knob, and bracket are constructed of heat resistant materials to withstand the heat for use in cooking and preparing food.

9. The device of claim 1, wherein said housing has rounded corners.

\* \* \* \* \*